A. B. BENNETT & F. N. STOKES.
SEED PLANTER.
APPLICATION FILED OCT. 6, 1917.

1,278,573.

Patented Sept. 10, 1918.
3 SHEETS—SHEET 1.

Witness

Inventors
A. B. Bennett &
F. N. Stokes
By Victor J. Evans
Attorney

A. B. BENNETT & F. N. STOKES.
SEED PLANTER.
APPLICATION FILED OCT. 6, 1917.
1,278,573.
Patented Sept. 10, 1918.
3 SHEETS—SHEET 2.
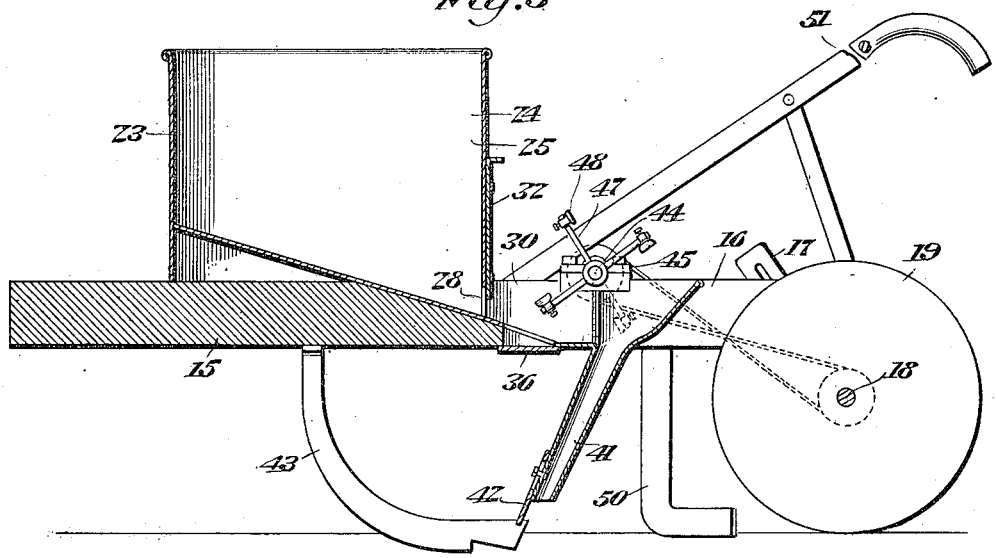
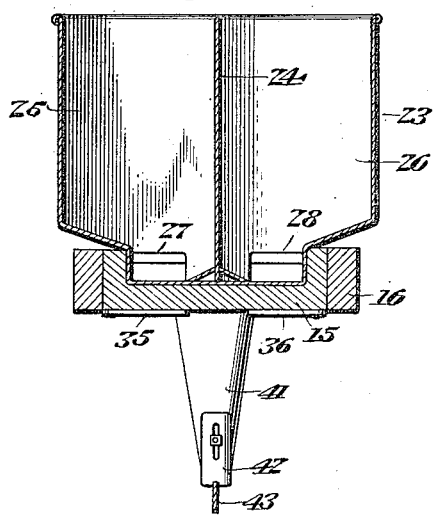
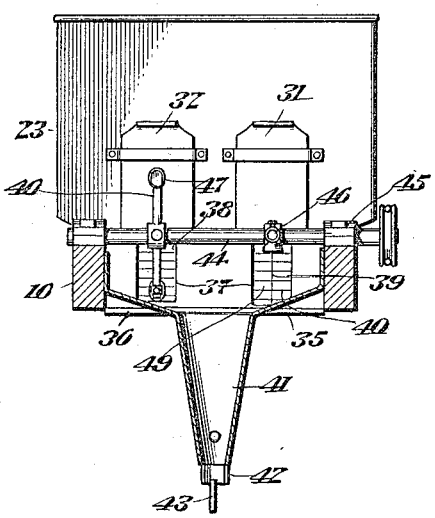
Witness
Inventors
A. B. Bennett &
F. N. Stokes
By Victor J. Evans
Attorney A. B. BENNETT & F. N. STOKES.
SEED PLANTER.
APPLICATION FILED OCT. 6, 1917.
1,278,573.
Patented Sept. 10, 1918.
3 SHEETS—SHEET 3.
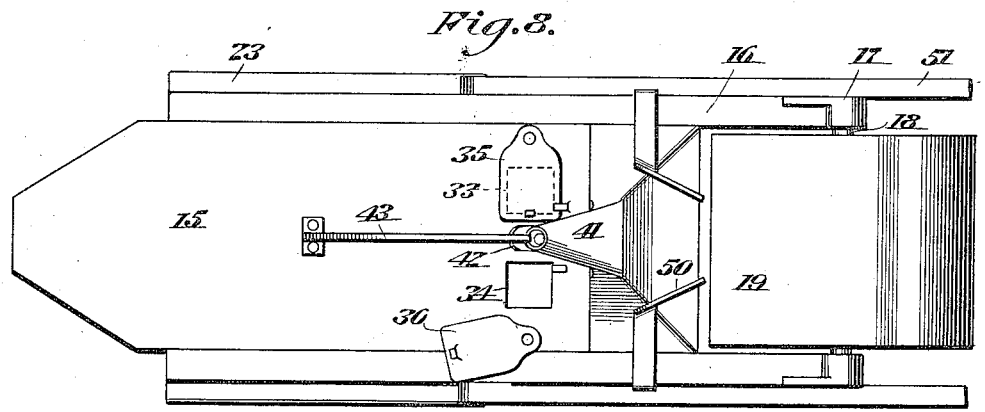
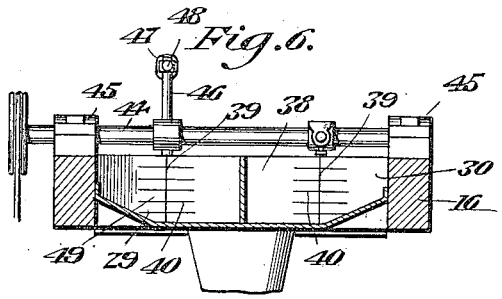
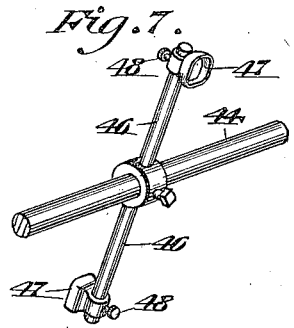
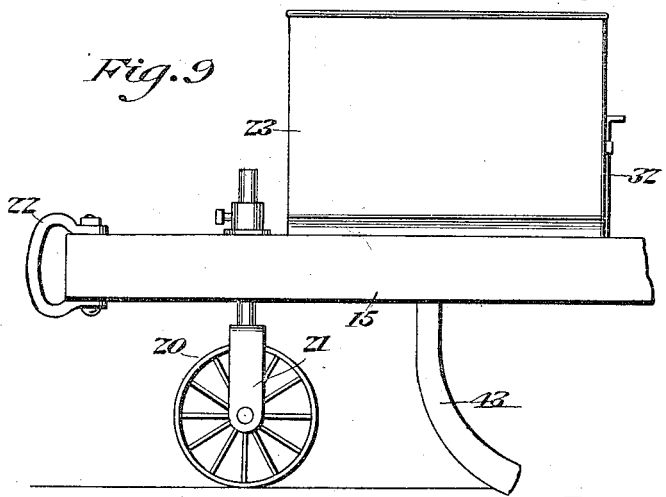
Witness
Inventors
A. B. Bennett &
F. N. Stokes
By Victor J. Evans
Attorney

UNITED STATES PATENT OFFICE.

ALFRED B. BENNETT AND FESTUS N. STOKES, OF STOKESVILLE, GEORGIA.

SEED-PLANTER.

1,278,573.  Specification of Letters Patent.  Patented Sept. 10, 1918.

Application filed October 6, 1917.   Serial No. 195,100.

*To all whom it may concern:*

Be it known that we, ALFRED B. BENNETT and FESTUS N. STOKES, citizens of the United States, residing at Stokesville, in the county of Charlton and State of Georgia, have invented new and useful Improvements in Seed-Planters, of which the following is a specification.

This invention relates to seed planters and one object of the invention is to produce a simple and effective machine whereby several varieties of seed may be planted simultaneously or in alternate order as desired.

A further object of the invention is to produce a simple and improved planter whereby several varieties of seeds may be planted in hills, in alternate order, means being provided whereby one variety of seed may be planted several times in the interval between the plantings of another variety of seed.

A further object of the invention is to produce a planter of the type described having means for interrupting the planting of either variety of seeds.

A further object of the invention is to simplify and improve the construction of the seed receptacles and the means for taking the seed therefrom and conveying it to the seed spout.

With these and other ends in view which will readily appear as the nature of the invention is better understood, the same consists in the improved construction, novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Fig. 3 is a longitudinal sectional view taken on the line 3—3 in Fig. 1.

Fig. 4 is a transverse sectional view taken on the line 4—4 in Fig. 2.

Fig. 5 is a transverse sectional view taken on the line 5—5 in Fig. 1.

Fig. 6 is a transverse sectional detail view taken on the line 6—6 in Fig. 2.

Fig. 7 is a perspective detail view showing certain parts of the seed planting mechanism.

Fig. 8 is a bottom plan view of the planter.

Fig. 9 is a side view illustrating a modification.

Corresponding parts in the several figures are denoted by like characters of reference.

Figure 1:
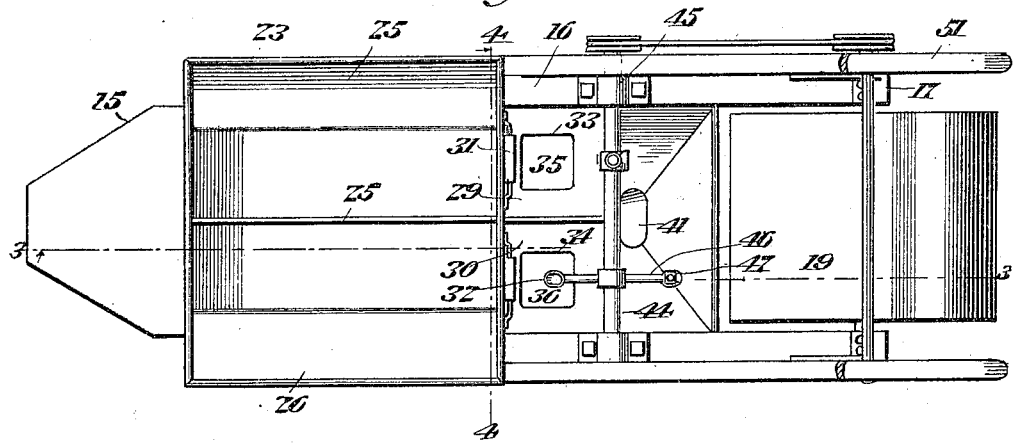
Figure 1 is a top plan view of a seed planter constructed in accordance with the invention.
Figure 2:
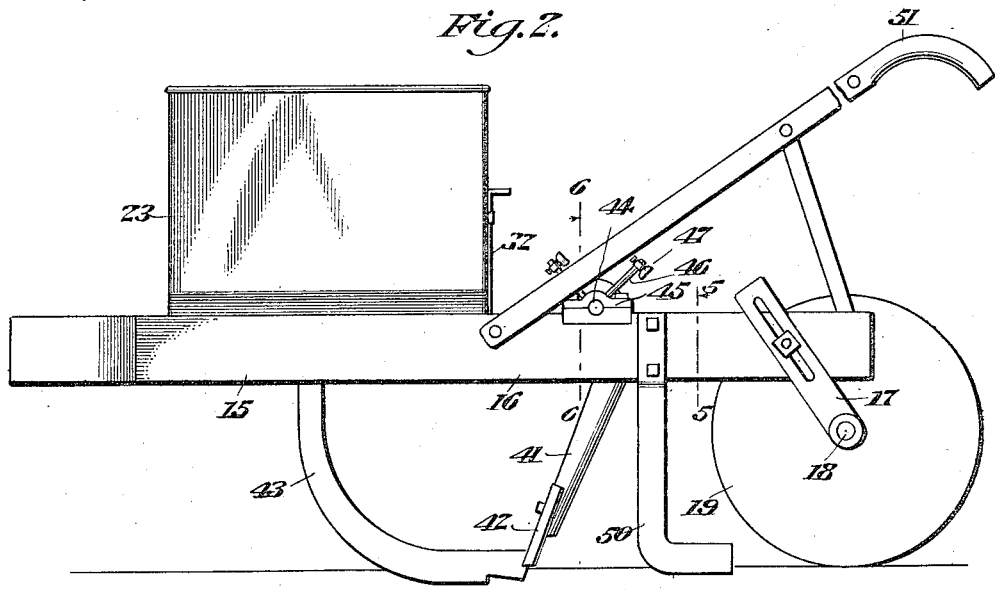
Fig. 2 is a side elevation of the same.

The frame of the improved planter may be described as consisting of a platform 15 having rearwardly extending arms 16. These arms may be provided near their rearward ends with brackets 17 mounted for vertical adjustment and affording bearings for a shaft or axle 18 carrying a ground wheel 19 which has been shown as being of such a width as to occupy practically the space between the arms 16, thereby constituting a roller whereby the earth will be compacted on the seed which has been planted in advance thereof. By the modified construction illustrated in Fig. 9, however, a comparatively narrow wheel 20 is supported in bearings 21 adjacent to the front end of the platform, the latter being provided with a clevis 22 for the attachment of the draft animal. The bearings 21 should be vertically adjustable for a purpose to be hereinafter described.

Mounted on the platform 15 adjacent to the front end thereof is a seed receptacle or reservoir 23 having a longitudinal vertical partition 24 whereby two separate compartments 25 and 26 are formed. The rear wall of the reservoir is provided with openings 27, 28 through which the contents of the respective compartments may escape to the planting hoppers 29, 30 which are located to the rearward of the seed reservoir and below the same so that seed may gravitate from the respective compartments 25, 26 to the respective hoppers 29, 30. The flow of seed through the openings 27, 28 may be regulated by valves 31, 32 or the flow from either or both compartments may be interrupted when desired by proper manipulation of said valves.

The bottom members of the respective planting hoppers 29, 30 are provided with openings 33, 34 which are normally obstructed by doors or valves 35, 36 which are pivoted on the underside of the platform 15 and which will permit the contents of either one of the hoppers 29, 30 to be discharged when desired. The rear wall of each hopper 29, 30 has a vertical slot or opening 37 which is obstructed by a flexible obstructing member 38 having a vertical slot 39 and a plurality of slits 40 extending laterally in both directions from said slot. A seed tube 41, is fixed between the arms 16 to the rearward of the planting hoppers 29, 30, the upper ends of said seed tube occupying the entire width between the arms 16, but said tube being tapered downwardly so that seed deposited in the upper end thereof will be dropped in the furrow which is formed by a furrow opener 42. Said furrow opener may be fixed adjustably on the lower end of the seed tube in a well known manner and it has been shown as being connected with the rearward end of a runner 43 the forward upper end of which is connected with the platform 15. A transverse shaft 44 is mounted in bearings on the upper faces of the arms 16, said bearings being designated by 45. This shaft which is positioned in advance of the seed tube and in approximate alinement with the rear walls of the hopper 29, 30 is provided with radial arms 46 that are located in approximate alinement with the slots 39 of the flexible obstructing members 38 of the respective hoppers. The shaft 44 receives motion in any convenient manner on the axle 18 of the compacting wheel 19 when the latter is used. When the front wheel 20 is used as seen in Fig. 9, motion will be transmitted therefrom to the shaft 44. The radial arms 46, of which any desired number may be used in connection with each planting hopper 29, 30, are provided at their outer ends with seed cups 47, said cups being however, connected detachably with the respective arms by means such as set screws 48. The seed cups 47 may be made of any desired dimensions according to the kind of seed that is to be planted and it is obvious that large or small cups may be mounted on the arms 46 operating in either of the hoppers 29, 30. It will be seen that the slots 39 in the flexible obstructing member 38 in connection with the slits 40 extending laterally therefrom serve to form a plurality of lips or tongues 49 some of which will yield to the passage of the seed cups connected with the arms 46 irrespective of the sizes of such seed cups, while the lips 49 not directly engaged by the seed cups will remain in obstructing position, thereby preventing seed from being wasted from the respective hoppers. It is obvious that by rotation of the shaft 44 the seed cups will be carried within the hoppers where they will be filled with seed which by the continued rotation of the shaft will be discharged in the top of the seed spout. Coverers 50 of well known construction are provided, said coverers having been shown as being attached to the outer faces of the arms 16. The machine is also shown as being provided with handles 51 to enable it to be conveniently guided by the operator who walks behind the machine.

From the foregoing description taken in connection with the drawings it will be seen that I have produced a seed planter of exceptionally simple construction whereby several varieties of seed may be planted in one row. By proper arrangement of the arms carrying the seed cups, the seed from the several compartments may be planted simultaneously or alternately as may be preferred. By removing the seed cups from some of the arms it will also be possible to vary the distance between the hills and also to plant one variety of seed two or more times in the interval between the plantings of the other variety of seed. Thus, for instance, corn and beans might be planted in alternate hills, or two hills of beans might be planted in each interval between the plantings of corn. By proper arrangement of the seed cups, that is to say, by detaching such seed cups as are not required for present use, it will also be possible to plant different varieties of seed in alternate rows. The depth of planting may be regulated by the proper adjustment of the ground engaging wheel. An important feature of the invention resides in the fact that the charge of seed planted in each hill is in full view of the operator who is thus enabled to ascertain any failure to drop the proper charge of seed at the proper time, and to correct such failure if desired. By means of the gates or valves 31, 32 the passage of seed from the compartments of the reservoir to the planting hoppers may be interrupted when desired and the contents of either or both planting hoppers may be discharged through the openings 33, 34 thereby avoiding wastage of seed or any possibility of such wastage.

What is claimed is:—

1. In a planter, a wall having an opening, a closure for said opening, said closure having a slot and slits extending laterally from the slot, said closure being made of flexible material and said slot and slits providing a plurality of narrow flexible lips, and a seed carrier element movable through the slot of the closure, said flexible lips permitting the passage of the seed carrier element and closing behind the same to prevent the passage of seeds through the closure other than the seeds carried by the carrier.

2. In a seed planter, a planting hopper having a wall provided with an opening, a flexible closure for said opening, said closure having a vertical slot and slits extending laterally therefrom to provide a plurality of narrow flexible lips, a driven shaft having radial arms arranged in alinement with the vertical slot of the closure and seed cups on and carried by said arms.

3. In a seed planter, a seed reservoir having a plurality of compartments, a plurality of planting hoppers arranged below the same, means for controlling gravitational discharge of seed from the compartments of the reservoir to the hoppers, each hopper having a wall provided with a vertical opening and a flexible closure for such opening, a seed tube supported adjacent to the said walls, said seed tube having a receiving end approximately equal to the combined width of the planting hoppers, a driven shaft having radial arms arranged in alinement with the openings of the respective hoppers, and seed cups detachably mounted on said arms, the flexible closures being slitted to provide lips that will admit of the passage of the radial arms carrying the seed cups.

4. In a seed planter, a planting hopper having a wall provided with an opening, a flexible closure for said recess, said closure having a vertical slot and slits extending laterally therefrom to provide a plurality of narrow flexible lips, a driven shaft having radial arms arranged in alinement with the vertical slots in the flexible closures, and seed cups mounted detachably on said arms.

5. In a seed planter, a plurality of hoppers each having a wall provided with a vertical opening, flexible closures arranged to obstruct said openings, each closure having a vertical slot and slits extending laterally therefrom to provide a plurality of narrow flexible lips, a seed spout arranged adjacent to the slotted walls of the hoppers, said spout having a receiving end of a width approximately equal to the combined width of the hoppers, a driven shaft having a plurality of radial arms in alinement with the vertical slot of each of the flexible obstructing members, and seed cups mounted detachably on the respective arms.

6. In a seed planter, a plurality of hoppers each having a wall provided with a vertical opening, flexible closures arranged to obstruct said openings, each closure having a vertical slot and slits extending laterally therefrom to provide a plurality of narrow flexible lips, a seed spout arranged adjacent to the slotted walls of the hoppers, said spout having a receiving end of a width approximately equal to the combined width of the hoppers, a driven shaft having a plurality of radial arms in alinement with the vertical slot of each of the flexible obstructing members, and seed cups mounted detachably on the respective arms; in combination with means for gravitationally supplying seed to the planting hoppers and means for regulating and interrupting such supply.

7. In a seed planter, a plurality of hoppers each having a wall provided with a vertical opening, flexible closures arranged to obstruct said openings, each closure having a vertical slot and slits extending laterally therefrom to provide a plurality of narrow flexible lips, a seed spout arranged adjacent to the slotted walls of the hoppers, said spout having a receiving end of a width approximately equal to the combined width of the hoppers, a driven shaft having a plurality of radial arms in alinement with the vertical slot of each of the flexible obstructing members, and seed cups mounted detachably on the respective arms; in combination with means for gravitationally supplying seed to the planting hoppers and means for regulating and interrupting such supply, each of the planting hoppers being provided with a discharge opening in the bottom thereof and a door for obstructing such discharge opening.

In testimony whereof we affix our signatures.

ALFRED B. BENNETT.
FESTUS N. STOKES.

Copies of this patent may be obtained for five cents each, by addressing the "Commissioner of Patents, Washington, D. C."